United States Patent
Lely

[15] 3,701,443
[45] Oct. 33, 1197

[54] TRAILERS
[72] Inventor: Cornelis Van Der Lely, 7 Bruschenrain, Zug, Switzerland
[22] Filed: Oct. 21, 1970
[21] Appl. No.: 82,589

[30] Foreign Application Priority Data
  Oct. 21, 1969  Netherlands..............6915852

[52] U.S. Cl....................214/77, 214/315, 220/97 C, 214/6 B, 214/8.5 C, 214/8.5 SS, 294/67 DA
[51] Int. Cl. ...............................................B60p 1/48
[58] Field of Search......214/77, 75 G, DIG. 10, 10.5, 214/75 R, 75 H, 77 P, 78, 80, 302, 8.5 C, 8.5 SS; 220/97, 97 C; 212/8, 8 A, 8 B, 9

[56] References Cited
UNITED STATES PATENTS

| | | | |
|---|---|---|---|
| 3,513,997 | 5/1970 | Heyer et al. | 214/77 R |
| 2,386,216 | 10/1945 | Hay | 214/77 R |
| 2,911,118 | 11/1959 | Tapp | 214/77 R |
| 3,448,874 | 6/1969 | Martinson | 214/77 R X |
| 3,495,726 | 2/1970 | Goldhofer | 214/77 R |
| 2,656,058 | 10/1953 | Foote | 214/77 R |
| 1,464,131 | 8/1923 | Goodger | 214/77 R |
| 3,080,096 | 3/1963 | Carfizzi | 220/97 R X |
| 3,468,439 | 9/1969 | Olitsky et al. | 214/77 R |
| 2,397,271 | 3/1946 | Ladwig | 214/DIG. 10 UX |
| 3,404,793 | 10/1968 | Pinkert | 214/77 R X |

*Primary Examiner*—Robert J. Spar
*Attorney*—Mason, Mason & Albright

[57] ABSTRACT

The combination of a trailer with a lifting mechanism and one or more relatively large containers for receiving agricultural produce and which, when empty, can be stacked one in the other. The lifting mechanism comprises a pair of parallelogram rod systems which extend from either side of the trailer and are pivotable relative thereto, a shaft connecting the upper ends of the rod systems for supporting engagement means adapted to connect to pins which extend from the upper rims of the containers whereby when such connection is made, a single container or a plurality of stacked containers can be loaded or unloaded from the trailer or stacked containers on the trailer by pivoting the lifting mechanism. The engagement means may be selectively affixed to its supporting shaft for maintaining the containers at a desired inclination throughout the loading or unloading cycle irrespective of their center of gravity. The containers may be provided with a pouring spout and tipped by the lifting mechanism to cause material therein to pour out of same.

7 Claims, 18 Drawing Figures

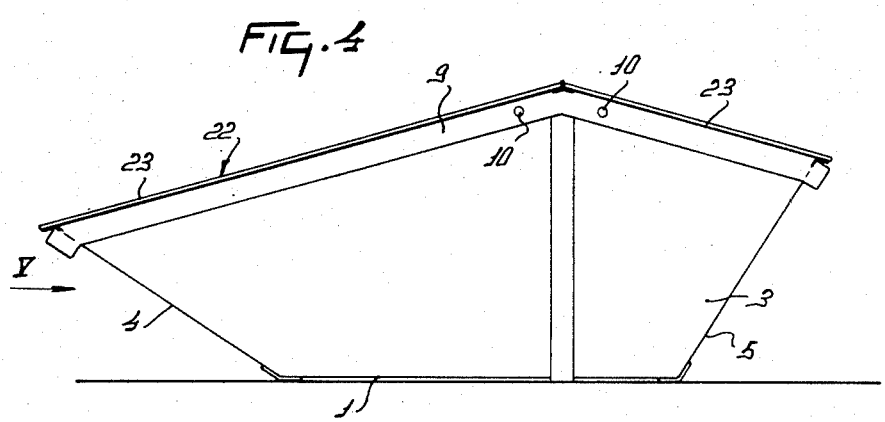
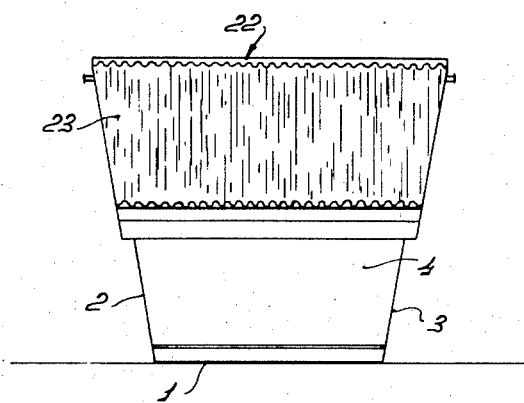

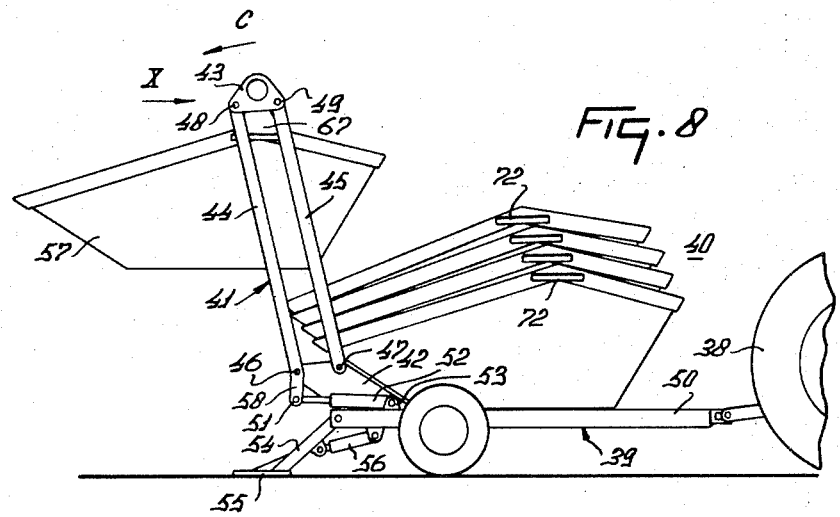
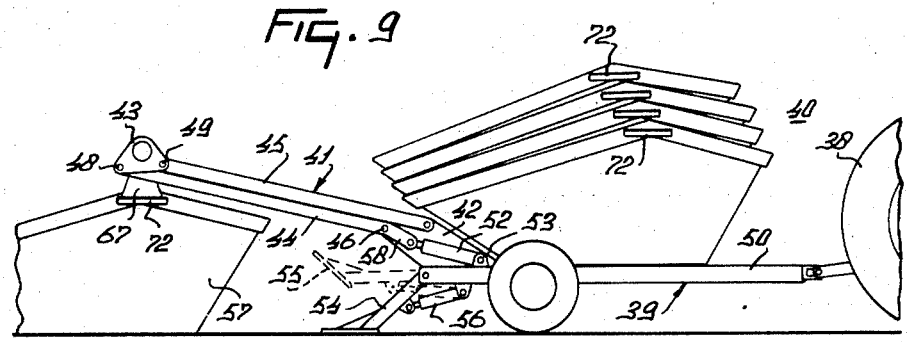
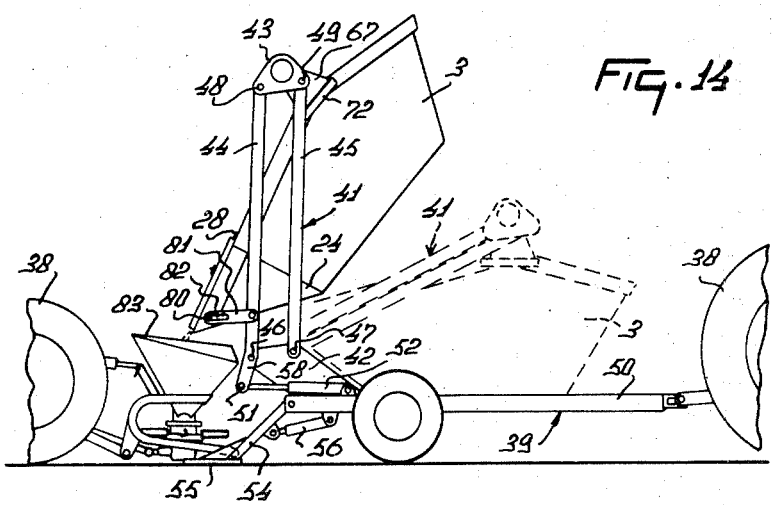

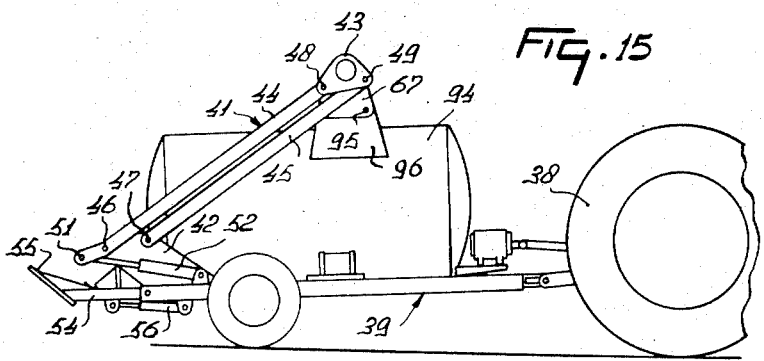
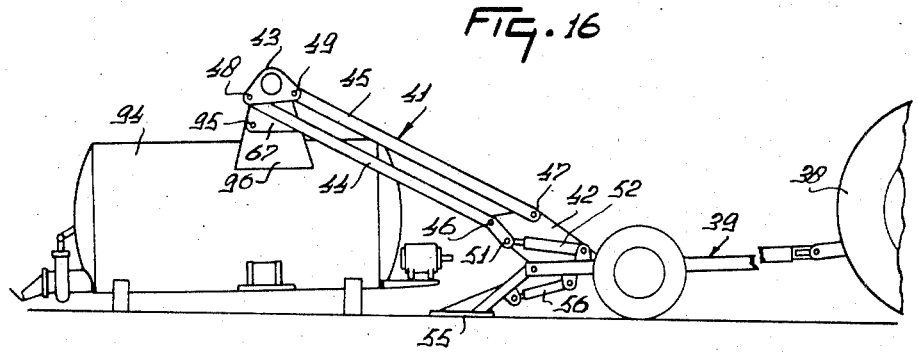

TRAILERS

SUMMARY OF THE INVENTION

The invention relates to a trailer for transporting agricultural produce which comprises a mobile frame and a lifting mechanism arranged on said frame which is adapted to load at least one container or the like on the frame or to remove the same from the frame.

According to the invention, the combination of the trailer and the lifting mechanism comprises a pivotal axis about which the container held by the lifting mechanism can be pivoted relative to the frame. This permits emptying the container without the need for unloading the container from the wagon or employing other mechanical discharging means on the container or on the combination. Even separate discharging means such as cranes with a gripper are not required.

According to a second aspect of the invention, the lifting mechanism and the container are constructed so that with the aid of the lifting mechanism a plurality of containers can be nested. In this manner a plurality of empty containers, which do not occupy a great amount of space and do not require a large trailer, can be transported to the field of the crop so that they can be distributed for being filled at the most favorable locations. The lifting mechanism is constructed so that it can perform all loading and unloading operations.

For a better understanding of the invention and to show how the same may be carried into effect, reference is made by way of example to the accompanying drawings, in which

BRIEF DESCRIPTION OF THE DRAWINGS

FIG. 4 is a side elevation of a container as shown in FIG. 2, including a lid.

FIG. 5 is an elevation of the container in FIG. 4, as seen in the direction of the arrow V.

FIG. 8 shows a combination of a plurality of containers and an agricultural wagon provided with a hydraulic lifting device formed by a parallelogram-shaped rod system.

FIG. 9 illustrates a position of the combination of FIG. 8, in which a container is put on the ground or taken from the ground.

FIG. 14 shows the container of FIG. 6 being emptied by means of the lifting device of the agricultural wagon.

FIG. 15 shows the combination of a tank-shaped container and an agricultural wagon.

FIG. 16 shows the position of the combination of FIG. 15, in which the tank is placed on the ground.

DESCRIPTION OF THE PREFERRED EMBODIMENTS

Figure 1:
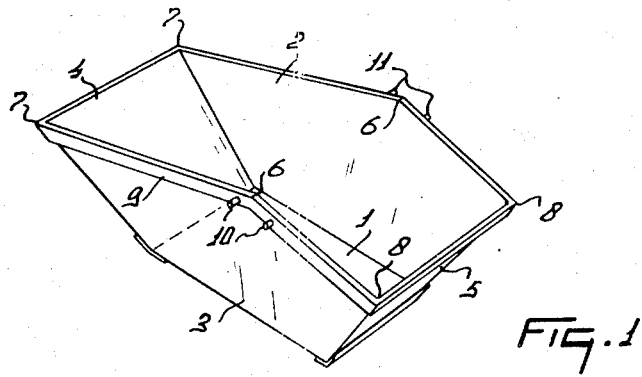
FIG. 1 shows a first embodiment of a container in accordance with the invention in a perspective view.

The embodiment of a container shown in FIG. 1 according to the invention comprises a flat bottom plate 1 on which four sidewalls 2, 3, 4 and 5 are arranged, each being primarily formed by flat plates which do not extend perpendicularly from the bottom plate but rather diverge outwardly from same.

Inasmuch as with embodiments which have four sidewalls and a rectangular top face with at least one sidewall extending outwardly and upwardly in a non-perpendicular manner relative to the bottom, the same can be nested so that the bottom surfaces are substantially parallel to each other, it will be understood that this is also possible with the container of FIG. 1, which comprises four sidewalls which extend outwardly and upwardly in a non-perpendicular manner to the bottom surface (see FIG. 8).

When the containers are nested, the overall space occupied is substantially smaller than the sum of the spaces occupied by the separate containers.

The sidewalls 2 and 3 of the container of FIG. 1 have each an upper rim formed by two relatively bent linear portions, with a point 6 of the bend of the two portions being located at a higher level than the junctions 7 and 8 of such upper rims with the upper rims of the sidewalls 4 and 5 adjacent thereto.

The junctions 8 of the bent upper rims are located at a higher level above the bottom surface than the junctions 7.

A container shown in FIG. 1 is suitable for conveying agricultural produce, for example, from the field crop such as roots, cereals, potatoes and the like in which case the container has to be sufficiently large for transporting large quantities in one batch. The capacity of the container is preferably two thousand liters.

A plurality of containers can be transported simultaneously in nested position by an agricultural vehicle to the field. After the containers have been discharged, simultaneously or separately, they are filled and conveyed separately or with several of them together (not stacked up of course) away by the vehicle. An important advantage of the nested containers for agricultural produce in accordance with the invention resides in that, when a plurality of nested containers are transported by the vehicle to the field, the separate containers can be put on the ground by the vehicle itself at different locations on the field, which locations may be chosen so that filling of the containers is completed with a minimum of work, and a single run of the vehicle is all that may be required for supplying all containers to the field.

The container shown in FIG. 1 is stiffened by providing the sidewalls 2, 3, 4 and 5 near their upper edge with a stiffening rim 9. On either side of the highest points 6 of the upper rims of each of the sidewalls 2 and 3 the stiffening rim 9 is provided with two substantially cylindrical, outwardly projecting lugs 10 and 11 respectively so that the center lines of the lugs 10 on sidewall 2 are substantially in line with the lugs 11 on the sidewall 3.

Figure 2:
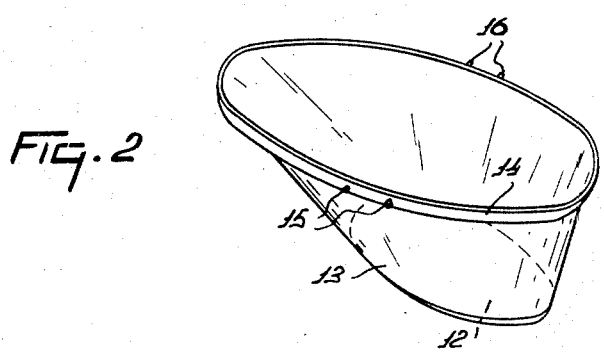
FIG. 2 shows a second container embodying the invention in a perspective view.

FIG. 2 shows a second embodiment in which a flat bottom 12 joins a curved sidewall 13. In this embodiment the intersections of the sidewall with a plane perpendicular to the bottom 12 are straight lines converging towards the bottom. The sidewall is provided with a stiffening rim 14 provided with lugs 15 and 16 respectively which are aligned as described with reference lugs 10 and 11 of FIG. 1.

Figure 3:
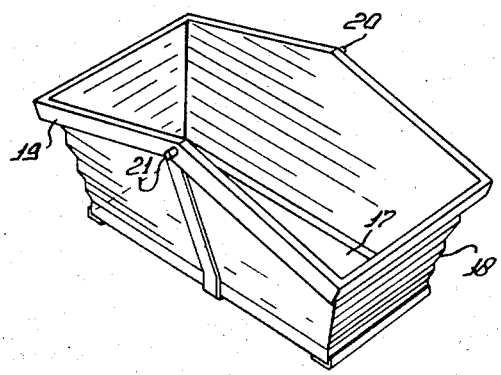
FIG. 3 shows a third container embodying the invention in a perspective view.

FIG. 3 shows a third embodiment in which a flat bottom 17 joins four sidewalls which as in FIG. 1 are not at right angles to the bottom 17 but extend outwardly and upwardly therefrom. The sidewalls are provided with stiffening portions 18 which extend parallel to bottom 17. Such sidewalls are formed by sheets rolled or impressed to each other at the corners of the container and each is provided at their upper edges with a stiffening rim 19 and lugs 20 and 21, the center lines of which are aligned.

In practice the contents of a container may be sensitive to moisture due to rain or the like. In such case, it is desirable to protect the contents. FIGS. 4 and 5 show a simple protection in the form of a detachable lid 22 formed by polyester sheets 23 arranged on a simple beam grating (not shown).

Figure 6:
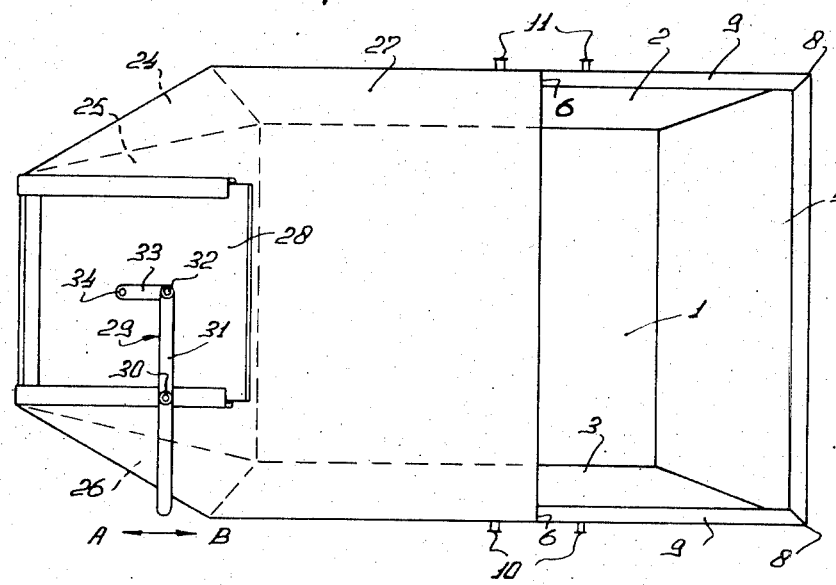
FIG. 6 is a plan view of a further container which includes, in part, a lid.
Figure 7:
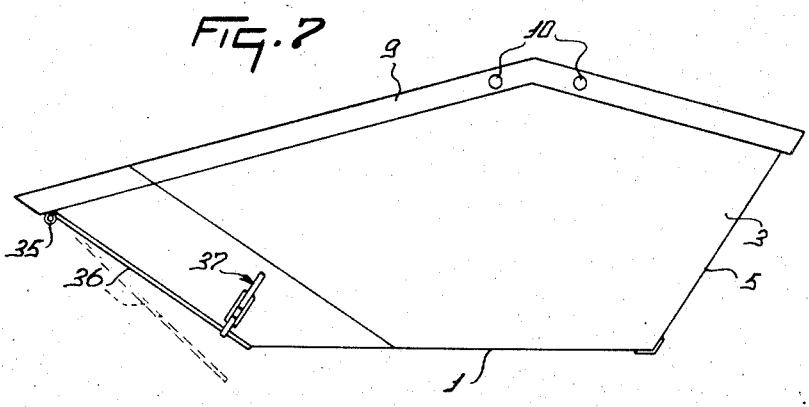
FIG. 7 shows a fifth embodiment of a container in accordance with the invention which includes a pivotable sidewall.

It may be desirable to empty the container by causing the contents to, in effect, flow out of it, such as for example, when the containers are filled with grain supplied from a combine harvester. It is then advantageous to provide the container with an outlet flow member. In the container shown in FIG. 6, in which certain parts such as the bottom and some walls are designated by the same reference numerals as in FIG. 1, the outlet flow member is formed by the three adjoining walls 24, 25 and 26, which constitute together a spout. It is advantageous for the plane of the central wall 25 to be at a smaller angle to the plane of the bottom plate than the planes of the further sidewalls — an angle preferably of about 30°, for example. When the container is emptied by tilting it in an inclined position, it is advantageous to have the possibility of closing the upper side side of the parts of the container located near the outlet 24, 25, 26 by a detachable lid 27. The lid 27 is provided with a hatch 28 which is located near the upper edge of wall 25 and is displacable substantially in the plane of lid 27 by means of a rod system 29. This rod system 29 comprises a rod 31 which is adapted to pivot about a pivotal rod 30 and is coupled with a rod 33 by means of a pivotal shaft 32. Rod 33 in turn is pivoted to hatch 28 at the location of pivotal shaft 34 on the hatch. By moving one end of rod 31 in the directions of one of the arrows A and B of FIG. 6, hatch 28 can be opened or closed. FIG. 7 shows a container in which the outlet is formed by a sidewall 36 adapted to pivot about a pivotal shaft 35, extending parallel to the bottom plate 1. A latching member 37 being provided to lock sidewall 36 in position.

FIG. 8 shows a plurality of nested containers of the embodiment shown in FIG. 1. It will be apparent that the containers may be nested both on a vehicle and in a storage area, the bottom surfaces being parallel to each other. It is important that containers according to the invention be handled by a suitable trailer so that not only one container but also a plurality of nested containers together can be stowed and discharged by the vehicle itself. A separate device for loading and unloading on or from an agricultural vehicle is thus superfluous.

The combination of a container and a self-charging agricultural vehicle requires the provision of at least one lifting device suitable for the containers on the vehicle for loading or unloading them separately or in nested position. FIG. 8 shows a trailer, in this case a single-axle agricultural vehicle or wagon 39 drawn by a tractor 38, the wagon being loaded with a plurality of nested containers 40. Wagon 39 is equipped in this embodiment with a hydraulic lifting device, which is formed by a parallelogram-shaped structure 41, one of which is located on either side of the wagon 39 directly opposite each other. The lower part thereof is formed by a plate 42, whereas the upper part is formed by a bridge 43 and two parallel rods 44 and 45. These longitudinal rods 44 and 45 are adapted to pivot about the pivotal shafts 46 and 47 respectively with respect to the plates 42 and about the pivotal shafts 48 and 49 respectively with respect to the bridge 43. The center lines of pivotal shafts 46, 47, 48 and 49 of each of the parallelogram-shaped structures in either side of the wagon 39 are aligned with each other. At least one rod 44 has a prolongation 58 lying on the other side of the pivotal shaft 46. Plate 42 extends parallel to a substantially perpendicular plane and is fastened to the frame beam 50 of the wagon 39. The line of connection between the pivotal shafts 46 and 47 extends approximately parallel to frame beam 50. The prolongation 58 is provided at its end with a pivotal shaft 51, about which the piston rod of a hydraulic cylinder 52 is adapted to pivot. This hydraulic cylinder 52 is pivoted by the other end to a bracket 53 fastened to the frame beam 50.

At the end of frame beam 50 a support 54 is pivotally connected with a foot plate 55. Support 54 can be pivoted by means of a hydraulic cylinder 56. In the position shown in FIG. 8 the support 54 bears on the ground for preventing unwanted jolts of wagon 39 during the loading and unloading operations. Hydraulic cylinders 52 and 56 are connected with a field pump and a control-mechanism on the tractor (not shown). FIG. 8 shows the situation during the discharge of a container 57, while wagon 39 is still loaded with a few nested containers.

By moving the piston rod of the hydraulic cylinder 52 inwardly, the upper end of the parallelogram structure 41 moves in the direction of the arrow C. The line of connection between pivotal shafts 48 and 49 remains parallel to the line of connection between pivotal shafts 46 and 47. When container 57 is held with respect to the bridge 43 so that it is not displaced with respect to pivotal shafts 48 and 49, the bottom surface of the container remains substantially parallel to the frame beam 50 despite the fact that the center of gravity of the filled or empty container may not be located directly under bridge 43. It is thus possible to nest containers so that the bottom surfaces are substantially parallel to each other. FIG. 9 shows the situation in which the container 57 is put on the ground.

Figure 10:
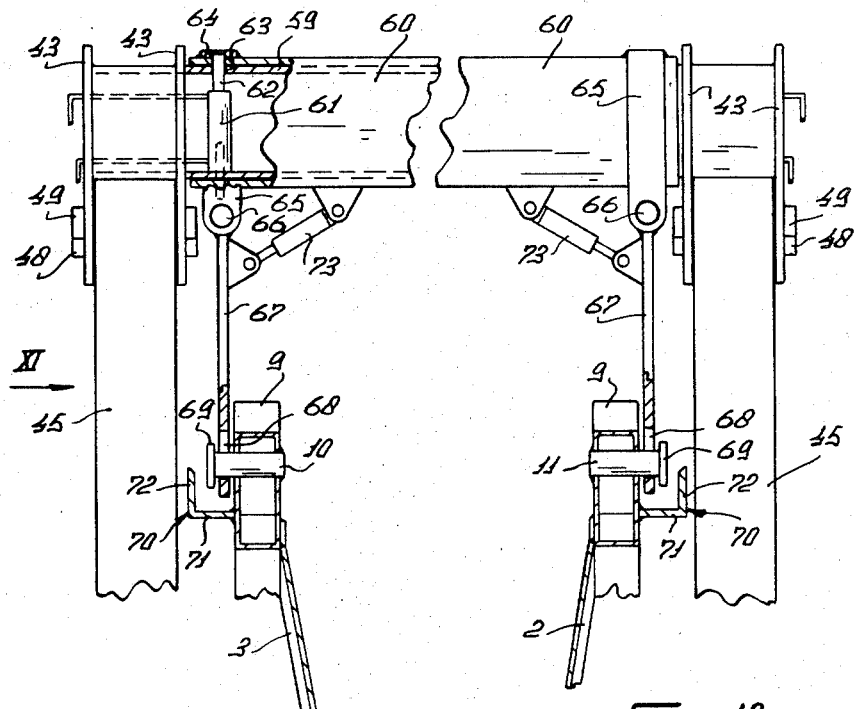
FIG. 10 is a fragmentary elevation in partial section of the upper part of the parallelogram-shaped rod system with a container suspended to it, taken in the direction of the arrow X in FIG. 8.
Figure 11:
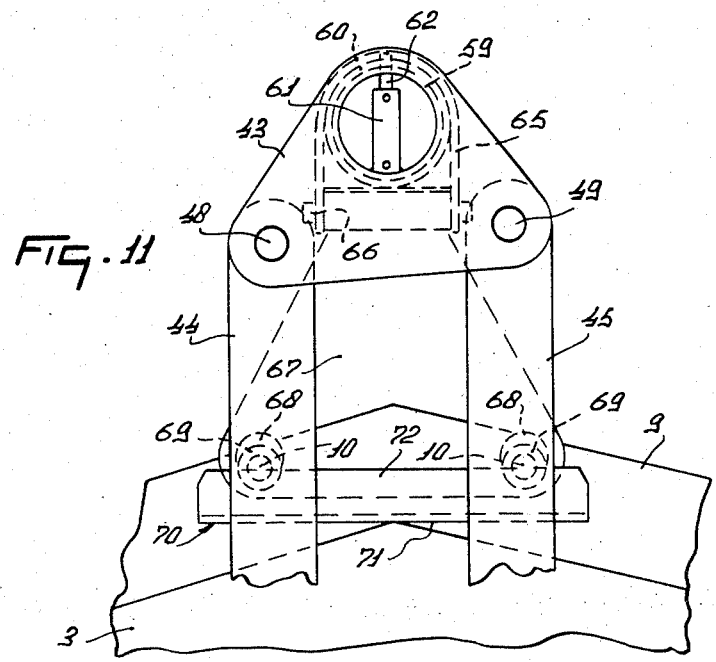
FIG. 11 is a fragmentary elevation as seen in the direction of the arrow XI in FIG. 10.

FIG. 10 shows rods 45, pivotal shafts 48, 49 and bridges 43 of the parallelogram structures on either side of the wagon. The bridges 43 are rigidly interconnected by a distance tube 59 extending transversely of the direction of movement of the wagon. Distance tube 59 is surrounded by a supporting tube 60 which can be fixed in position relative to tube 59 or, if desired, turned about tube 59. Supporting tube 60 can be fixed relatively to tube 59 by means of two hydraulic cylinders 61 which are arranged in a substantially vertical position in distance tube 59 near rods 44 and 45. Hydraulic cylinders 61 are fastened by their lower ends to the interior of distance tube 59, and piston rods 62 of these hydraulic cylinders 61 project in corresponding openings 63 of the wall of distance tube 59. The wall of supporting tube 60 also has openings 64 which register with openings 63 in a given position of supporting tube 60 relative to distance tube 59. When in this position hydraulic cylinders 61 are energized, rods 62 move upwardly through openings 64 of supporting tube 60 so that tubes 59 and 60 are not turnable relative to each other. This is illustrated in FIG. 11. Hydraulic cylinders 61 can be governed by means of the control-mechanism on tractor 38. By means of suspending strips 65, fastened to supporting tube 60, horizontal pivotal shafts 66 extend substantially in the direction of movement of wagon 39 and hold each a supporting plate 67. Supporting plates 67 extend, during the transport of a container, substantially at right angles to the center lines of pivotal shafts 46, 47, 48 and 49. Supporting plates 67 have two openings 68 each, the size and relative distance of which are such that lugs 10 and 11, provided with shoulders 69 fastened to a stiffening rim 9 of a container, can each pass without difficulty through one of openings 68 of each supporting plate 67.

Stiffening rim 9 is provided on either side of the container at the plates of lugs 10 and 11 with a gutter 70, formed by a horizontal bottom plate 71, located beneath the lugs, and a rim 72 joining the bottom at right angles and extending in a vertical direction approximately up to the center lines of lugs 10 and 11. The lower edge of supporting plate 67 forms a straight line. Between supporting tube 60 and each of supporting plates 67, a hydraulic cylinder 73 crosses a pivotal shaft 66 at right angles. Each such cylinder 73 is actuated from controls in the tractor.

When a container is lifted by the parallelogram structure 41 of the agricultural vehicle, the two parallelogram structures 41 are moved by means of hydraulic cylinder 52 so that the lower sides of supporting plates 67 are lowered between rims 72 of gutters 70 and shoulders 69 into gutters 70 until they bear on bottom plates 71, while supporting plates 67 are slightly turned outwardly about pivotal shafts 66 by hydraulic cylinders 73. When then the tractor with the wagon 39 is slightly moved and the hydraulic cylinder 73 is energized, openings 68 in supporting plates 67 snap around shoulders 69 and onto lugs 10 and 11. Then hydraulic cylinder 62 is energized so that lugs 10 and 11 are received in openings 68 and the container can be lifted.

The container is removed from the parallelogram structures in the inverse order of operation.

Figure 12:
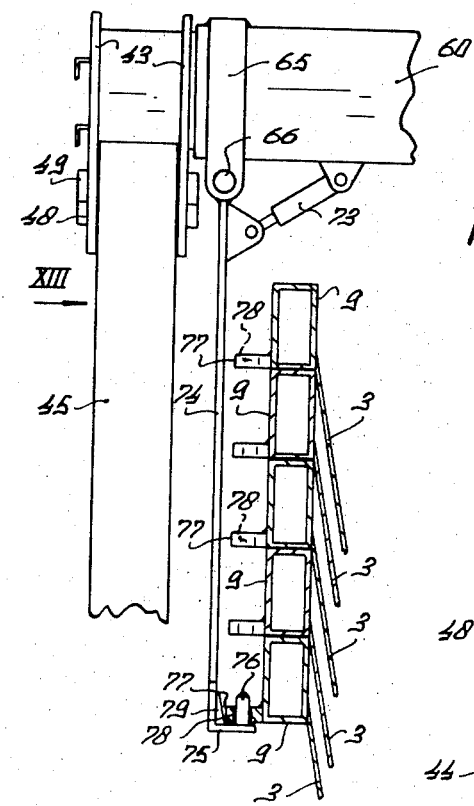
FIG. 12 illustrates in fragmentary elevation a second embodiment in partial section of the upper part of the lifting device as seen from the direction of the arrow X in FIG. 8.
Figure 13:
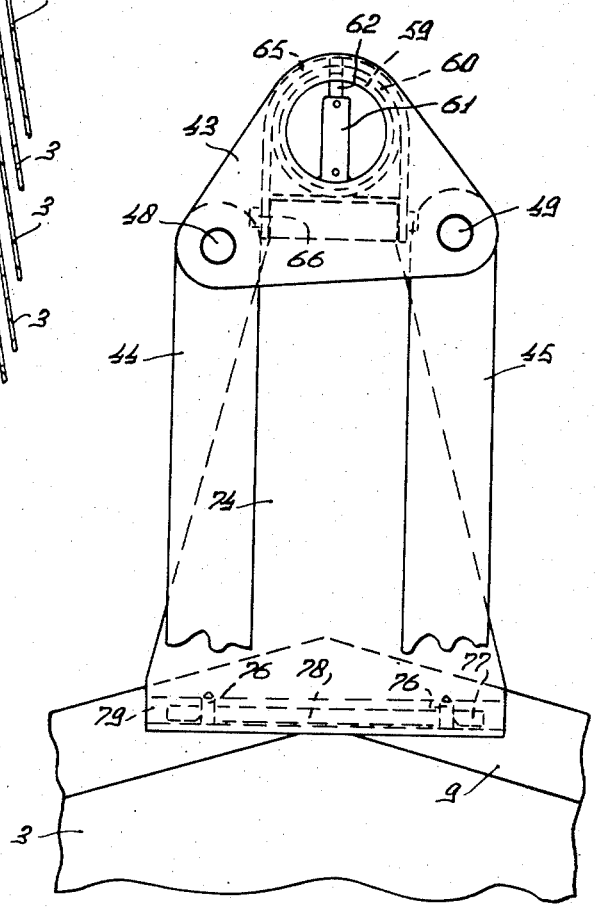
FIG. 13 is a fragmentary side elevation taken in the direction of the arrow XIII in FIG. 12.

In the embodiment shown in FIGS. 12 and 13, the parts corresponding with those of FIGS. 10 and 11 are designated by the same reference numerals. The construction shown in FIGS. 12 and 13 is particularly suitable for lifting a plurality of containers together.

Supporting plates 74 are adapted to turn about pivotal shafts 66 and have such a vertical length that they bridge stiffening rims 9 of a plurality of nested containers. Supporting plates 74 have a lower bent-over rim 75 which includes for each plate 74 two pins 76 at right angles to said rims 75. The corner between the supporting plate 74 and the rim 75 accommodates throughout its length a bevelled lug 79 serving as a finder and for stiffening the corner.

The stiffening rim 9 of the containers is provided on the sides of the walls 2 and 3 with strips 77 having an elongated slot 78. The length of slot 78 is such that pins 76 can be received in the direction of length of the slot. The height of pins 76 is at least twice the height of strip 77. In this construction supporting plates 74, turned outwardly by hydraulic cylinders 73, are lowered as far as possible around the contacting stiffening rims 9. Then cylinders 73 are energized so that at the position of lug 79 supporting plates 74 are pressed against the lower stiffening rims 9. By slightly moving the vehicle and by energizing the hydraulic cylinders 52, pins 76 which are tapered in the upper ends snap into the slot 78 after which the nested containers can be lifted.

If the center of gravity of the containers, viewed in the direction of movement, is not located substantially beneath bridge 43 and if the lifted containers tend to tilt relative to the supporting plate 74, while the tubes 59 and 60 are relatively fixed in position, one of the ends of slot 78 is jammed at one of the pins 76 on either side of the containers.

FIG. 14 shows the situation in which the container is tilted. In this case the container has a partial lid 27 and a slide 28, shown in FIG. 6. The container is provided on either side near the outlet with a lug 80, about which a rod 81 is adapted to pivot on either side of the container. The rod 81 is provided with an elongated slot 82 and is pivoted on the side remote from lug 80 to rod 44.

For lifting the container from the agricultural trailer 39, pins 62 are withdrawn by means of hydraulic cylinders 61 from the recesses in supporting tube 60 (FIGS. 10 and 11), so that supporting tube 60 is able to pivot about distance tube 59. When the container is lifted by the lifting device, it tends to tilt because its center of gravity usually does not lie beneath the bridge 43. Rod 81 prevents unwanted swinging and controls the position of the container during its pivotal movement. The length of rod 81, the pivotal joint of rod 81 with the rod 44 and the length of elongated slot 82 determine the desired tilting movement of the container. When the container has been swung into the desired position, for example, above a fertilizer 83, the distributor is filled by causing the fertilizer in the container to flow from the outlet by actuating the slide 28 with the aid of the rod 31 (FIG. 6).

FIGS. 15 and 16 show the unloading of a cylindrical tank 94 which is filled with a substance such as, for example, liquid manure, the tank (FIG. 15) being received on trailer 39 and being held in position thereon by means of the above-mentioned lifting mechanism 41. The lifting mechanism 41 in this case is provided with supporting plates 67 as illustrated in FIGS. 10 and 11. Two lugs 95 attached via brackets 96 to each side of the tank are passed through openings 68 in this case.

By energizing the hydraulic cylinder 52, tank 94 may be unloaded and placed on the ground (FIG. 16). During this movement supporting tube 60 is secured relative to distance tube 59 be means of rod 62 (FIG. 10 and 11). In order to prevent movement by trailer 39, support 54 is extended by energizing hydraulic cylinder 56.

Figure 17:
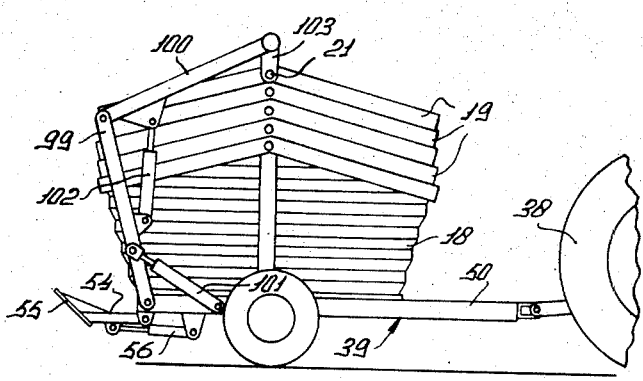
FIG. 17 shows an embodiment of a combination of containers of FIG. 3 and an agricultural wagon equipped with a second embodiment of the hydraulic lifting device.
Figure 18:
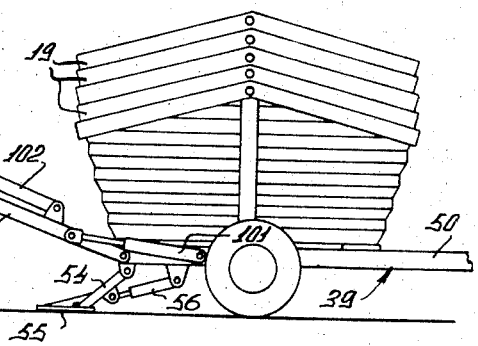
FIG. 18 shows the combination of FIG. 17 with a container being placed on the ground.

FIGS. 17 and 18 show examples of handling the containers as shown in FIG. 3. The lifting device of wagon 39, driven by the hydraulic system of the tractor 38, comprises two relatively pivotable arms 99 and 100, the arm 99 being pivoted to frame beam 50. The position of the piston rod in a hydraulic cylinder 101 determines the angle between arm 99 and frame beam 50. The position of the piston rod in a hydraulic cylinder 102 determines the angle between the arms 99 and 100. At the end remote from the arm 99, arm 100 is provided with a hoisting tag 103 by which the container is lifted by lugs 20 and 21 respectively (FIG. 3). On the other side of wagon 39 a similar part of the lifting device is arranged so that the pivotal shafts between arm 99 and frame beam 50 and those between arms 99 and 100 are in line with each other. The ends of arms 100 located near the hoisting tag 103 may be connected with each other.

When the piston rod of hydraulic cylinder 102 is moved outwardly by fluid pressure from the pump of tractor 38, arms 99 and 100 are brought approximately in line with each other and the upper container is lifted out of the lower container. Then, by moving the piston rod of cylinder 101 outwardly, the lifted container is swung into a position as shown in FIG. 18, after which hoisting tag 103 can be removed from lug 20.

Agricultural containers according to the invention provide the important advantage that they can be stacked one in the other so that a plurality of containers together can be stowed, transported and discharged.

The transport of containers in accordance with the invention requires considerably less labor because a plurality of containers can be conveyed at the same time. The loading capacity of an agricultural vehicle is in this way considerably enhanced.

The combination of the container or containers according to the invention and a trailer suitable for stowing, conveying and discharging the same provides a very effective working unit in which separate loading and discharging systems are superfluous and the stowing and discharging of the containers are not bound to a given place. Moreover, the nested containers occupy a minimum storage space. In the method of operation thus rendered possible, an agricultural wagon provided with a lifting device suitable for the containers can supply a plurality of nested containers together and deposit the separate containers on the field of the crop concerned at those spots which are most suitable for efficient filling of the containers and for loading the filled containers and conducting them away. When the loading surface of the wagon is sufficiently large, a plurality of filled containers can be conducted away together. The containers are preferably identical.

It should be noted that one or more sidewalls or the bottom of the container may be formed by interrupted surface, for example, by parallel, spaced slats, by perforated sheets and the like, instead of closed sheet.

Having thus described my invention, what I claim as new and desire to secure by letters patent of the United States is:

1. A trailer for transporting material which comprises:
    a mobile frame;
    a plurality of containers disposed in a stack carried by said frame each of said containers having extending connection means near their upper edges and in offset relationship to the center of gravity of the container;
    a lifting mechanism pivotally mounted on said frame, said lifting mechanism comprising a pair of parallel rod systems pivotally attached on opposing sides of said frame, the ends of the rods of said systems being located at the corners of a quadrangle;
    said lifting mechanism further comprising engagement means attached to the free ends of said rod systems adapted to perform the functions of detachably connecting said lifting mechanism to the connection means of each said container and of preventing angular displacement of the connected container relative to said frame so said lifting mechanism swings about its pivot axes;
    whereby said lifting mechanism is adapted to load and unload relative to said frame any selected one of said plurality of containers and all containers stacked thereon separately from any remaining containers by connecting said engagement means to the connection means of the selected container and lifting said selected container and all containers stacked thereon and removing them together in their stacked condition by said lifting mechanism away from such lower containers of said plurality of containers as may remain.

2. A trailer as claimed in claim 1, wherein said engagement means connect the selected container of said plurality automatically when said engagement means are positioned in an upward direction by said lifting means.

3. A trailer as claimed in claim 2, wherein said engagement means connect with said extending connection means on their undersides.

4. A trailer as claimed in claim 1, wherein said engagement means are pivotable about an axis extending substantially in the usual direction of travel of said trailer.

5. A trailer as claimed in claim 4, wherein said engagement means are hydraulically actuated.

6. A trailer as claimed in claim 1, wherein support means is provided preventing unwanted movements of said trailer during loading or unloading operations.

7. A trailer as claimed in claim 6, wherein said support means is pivotable relative to said frame by hydraulic means.

* * * * *

UNITED STATES PATENT OFFICE
CERTIFICATE OF CORRECTION

Patent No. 3,701,443            Dated October 31, 1972

Inventor(s) Cornelis Van Der Lely

It is certified that error appears in the above-identified patent and that said Letters Patent are hereby corrected as shown below:

On the cover sheet Item (45)

"October 33. 1197" should read -- October 31, 1972 --.

Signed and Sealed this

Seventeenth Day of October 1978

[SEAL]

Attest:

RUTH C. MASON
Attesting Officer

DONALD W. BANNER
Commissioner of Patents and Trademarks